United States Patent
Stephan et al.

(10) Patent No.: US 12,363,130 B2
(45) Date of Patent: Jul. 15, 2025

(54) METHODS AND DEVICES FOR SECURING A MULTIPLE-ACCESS PERIPHERAL NETWORK

(71) Applicant: Orange, Issy-les-Moulineaux (FR)

(72) Inventors: Emile Stephan, Chatillon (FR); Frédéric Fieau, Chatillon (FR); Gaël Fromentoux, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 183 days.

(21) Appl. No.: 17/622,635

(22) PCT Filed: Jun. 4, 2020

(86) PCT No.: PCT/EP2020/065516
§ 371 (c)(1),
(2) Date: Dec. 23, 2021

(87) PCT Pub. No.: WO2020/259980
PCT Pub. Date: Dec. 30, 2020

(65) Prior Publication Data
US 2022/0360454 A1    Nov. 10, 2022

(30) Foreign Application Priority Data

Jun. 26, 2019 (FR) .................... 1906988

(51) Int. Cl.
*H04L 29/00* (2006.01)
*H04L 9/32* (2006.01)
(Continued)

(52) U.S. Cl.
CPC .......... *H04L 63/126* (2013.01); *H04L 9/3234* (2013.01); *H04L 9/3247* (2013.01); *H04L 9/3271* (2013.01); *H04W 12/63* (2021.01)

(58) Field of Classification Search
CPC ... H04L 63/126; H04L 9/3234; H04L 9/3247; H04L 9/3271
(Continued)

(56) References Cited

U.S. PATENT DOCUMENTS 8,181,262 B2 *  5/2012  Cooper ............... H04W 12/062
726/28
2009/0300364 A1   12/2009  Schneider
(Continued)

FOREIGN PATENT DOCUMENTS

WO   WO 2017/105733 A1   6/2017

OTHER PUBLICATIONS

Tarik Taleb, Senior Member, IEEE, Konstantinos Samdanis, Badr Mada, Hannu Flinck, Sunny Dutta, and Dario Sabella, "On Multi-Access Edge Computing: A Survey of the Emerging 5G Network Edge Cloud Architecture and Orchestration" 2017, IEEE, vol. 19, No. 3, pp. 1657-1681 (Year: 2017).*
(Continued)

*Primary Examiner* — Jeffrey C Pwu
*Assistant Examiner* — Michael D Anderson
(74) *Attorney, Agent, or Firm* — Knobbe, Martens, Olson & Bear, LLP (57) ABSTRACT

A description is given of a method for securing a multi-access edge computing network, where provision is made for a hardware security device designed to be connected to a host module of the network. The method, implemented by the hardware security device, includes upon reception of a presence request from the host module in the network, verifying whether the presence request comprises data representative of an identifier of the host module, and, if so, sending a presence response to the host module, comprising a signature of the hardware security device.

13 Claims, 6 Drawing Sheets

(51) Int. Cl.
*H04L 9/40* (2022.01)
*H04W 12/63* (2021.01)

(58) Field of Classification Search
USPC .......................................................... 713/176
See application file for complete search history.

(56) References Cited

U.S. PATENT DOCUMENTS

2017/0251368 A1   8/2017   Ross et al.
2019/0109874 A1   4/2019   Samuel et al.

OTHER PUBLICATIONS

Multi Access Edge Computing (Year: 2017).*
Nicole Berdy, "Device provisioning: Identity attestation with TPM; Azure Blog and Updates: Microsoft Azure", Azure Microsoft Com, Nov. 7, 2017, URL: https://azure.microsoft.com/en-us/blog/device-provisioning-identity-attestation-with-tpm/.
Roman Rodrigo et al., "Mobile edge computing, Fog et al: A survey and analysis of security threats and challenges" Future Generations Computer Systems, Elsevier Science Publishers. Amsterdam, NL, vol. 78, Nov. 12, 2016, pp. 680-698.
Preliminary Search Report for French Application No. FR1906988, dated Mar. 26, 2020.
International Search Report for International Application No. PCT/EP2020/065516, dated Jun. 26, 2020.

* cited by examiner

METHODS AND DEVICES FOR SECURING A MULTIPLE-ACCESS PERIPHERAL NETWORK

CROSS-REFERENCE TO RELATED APPLICATIONS

This application is filed under 35 U.S.C. § 371 as the U.S. National Phase of Application No. PCT/EP2020/065516 entitled "METHODS AND DEVICES FOR SECURING A MULTIPLE-ACCESS PERIPHERAL NETWORK" and filed Jun. 4, 2020, and which claims priority to FR 1906988 filed Jun. 26, 2019, each of which is incorporated by reference in its entirety.

BACKGROUND

Field

This description relates to the field of network security. More specifically, aspects of this disclosure relate to methods and devices for securing a multi-access edge computing network.

Description of the Related Technology

Today, the fields of health, public transportation, energy, and the shipping industry are anticipated to constitute major areas of use of 5G standards in telecommunications, these fields being defined as 5G "verticals".

In this context, a difficulty commonly encountered is being able to guarantee optimum security and reliability of the data collected, saved, and exchanged between different partners, for example between a data owner and a provider of services applicable to these data. It is generally appropriate for these partners to agree to use common network infrastructures, the component elements of these infrastructures having a level of security that is both sufficient for and shared by each of the partners.

For example, to exchange confidential data coming from sensors located at one or more production sites, an electricity supplier may rely on the equipment and services provided by a partner telecommunications operator. Typically, two such partners share a common set of keys or electronic signatures, distributed in the infrastructures used to exchange data, it being possible for each of the partners to verify these keys or signatures at a given time.

To do this, there are known architectures involving multi-access edge computing networks, called MEC networks. The ETSI group ("European Telecommunications Standards Institute") has thus defined precise technical specifications relating to network architectures compatible with the standards of multi-access edge computing.

According to these standards, a MEC network provides a computer environment which allows hosting applications and services at a level positioned as close as possible to the "end user" levels, which makes it possible to store and process data with a faster response time.

In addition, a MEC network is designed to be compatible with different types of access, mobile or fixed, allowing it to be installed physically and directly in base stations or in physical infrastructures owned by users or by specific industries. The data collected or used can then be communicated via a higher level network, possibly virtual.

Typically, a MEC network comprises a specific module, called a multi-access edge network host module. This module provides a means of storing and processing data from the MEC network according to established conditions of availability, reliability, and security. These conditions can be associated with a corresponding key or electronic signature, in order to guarantee the security of the data.

When several users or partners exchange data through a common MEC network, the corresponding architecture defines a data exchange and control space in accordance with these conditions. In this case, only the data stored and processed by the host module according to these conditions will be considered.

However, this approach has several disadvantages.

Firstly, this approach requires deploying a large number of hardware elements close to the end user levels, which is not always possible for reasons of cost and of technical feasibility.

In addition, the hardware elements to be deployed are often of different types and manufacturers, which makes it difficult to define a common level of security and reliability.

Secondly, existing MEC networks and their component elements are not currently able to verify the presence of a multi-access edge computing network host module within a given MEC network.

In addition, it is not possible to select a multi-access edge computing network host module that adheres to a given encryption level and signature level.

The existing methods also do not allow managing and selecting a multi-access edge computing network host module in a sufficiently reliable and secure manner. The deployment of corresponding signatures or private keys in such a module is also problematic, particularly in the case of large networks.

SUMMARY OF CERTAIN INVENTIVE ASPECTS

In order to improve the situation and respond to this or these disadvantages, in a general manner a method is proposed for securing a multi-access edge computing network, wherein provision is made for a hardware security device designed to be connected to a host module of said network, and the method, implemented by said hardware security device, comprises:
  upon reception of a presence request from the host module in the network, verifying whether said presence request comprises data representative of an identifier of the host module, and, if so,
  sending a presence response to the host module, comprising a signature of the hardware security device.

Herein, a signature of a hardware security device is any type of certificate or key, private or public, compatible with the architecture and configuration of a multi-access edge computing network.

For example, to generate a signature, a requester creates a pair of keys, one public and the other private and kept secret. Such a signature may comprise a certificate signing request, called a CSR request, corresponding to a message sent from a requester to a certificate authority to request a digital identity certificate. If this request is later accepted, the certificate authority returns a digitally signed identity certificate with the private key which the certificate authority has available.

Herein, a signature contains at least one piece of information identifying the requester as well as at least one public key chosen by the requester. Preferably, said signature does not comprise the private key corresponding to said public key, but the latter remains subsequently usable for making use of the signature.

For example, a private key corresponding to a public key comprised in the signature can be used to sign a CSR request. Said signature may also comprise other identification information or proofs of identity required by the certificate authority.

Herein, the hardware security device comprises at least one system on a chip configured to implement the steps of a securing method according to the method or according to any of the embodiments of the method as described below.

In a preferred embodiment, said presence request from the host module in the network is sent by the host module upon reception of a test message sent by a security and privacy manager to the host module.

Herein, and in a non-limiting manner, the test message may reach the host module via one or more other elements of the network, for example via a multi-access edge platform manager or a virtualization infrastructure manager.

Herein, the security and privacy manager is arranged to be connected to the network, for example to the host module or to other elements of the network.

In a preferred embodiment, the method further comprises a determination of a level of security of the network based on said presence response.

Herein, said security level is, in particular, a security level of the host module.

In one embodiment, said determination of the security level is implemented upon reception of a response to a test message sent by the host module.

In an alternative embodiment, the determination of the security level is implemented upon reception of a response to a presence response sent by the hardware security device.

In a preferred embodiment, the presence request and the response of the hardware security device are respectively received and sent a plurality of times, respectively as a challenge and a response in an iterative authentication operation of the host module that is implemented by the hardware security device.

Herein, a challenge and a corresponding response together define a challenge-response authentication. Preferably, a challenge-response authentication comprises a family of protocols in which a question (the challenge) is presented by one party to another, the other party being invited to provide a valid response (the response) in order to be authenticated. An authentication comprises, for example, the use of passwords, and/or preferably the use of CSR requests and corresponding public and private key pairs, said keys possibly managed by a predefined certificate authority.

In a preferred embodiment, in each iteration of the iterative authentication operation of the host module, said response is obtained from said respective challenge by a signature of a predetermined number of bits comprised in the respective challenge, by means of a security key stored in the hardware security device.

In a preferred embodiment, the presence request is verified as comprising data representative of an identifier of the host module when it is verified that said identifier is comprised in a list stored in a memory accessible to the hardware security device.

In a preferred embodiment, the presence request comprises at least one data item representative of an identifier selected from the group: proof of attachment, connection information, an operator, an identifier of the host module, manufacturing information, or proof of presence of the hardware security device in the host module.

In a preferred embodiment, the method further comprises a security and privacy application module arranged to be connected to the host module and to make use of at least one signature or security key.

In a preferred embodiment, the method further comprises, upon reception of the presence response by the host module, an implementation of an action, said action being selected from the group: a verification of said presence response, an instantiation of a virtual server in the host module, an installation of a security key in the host module, a designation of a remote hardware security device, a designation of a remote hardware security device, and/or a designation of a virtual server of a remote host module provided with a security key.

Herein, a verification of a presence response includes, for example, a comparison between a signature included in the hardware security device and a signature included in the security and privacy manager. In particular, the signatures compared or to be compared can be security keys.

The development also relates to a hardware security device for securing a multi-access edge computing network, said device being arranged to be connected to a host module of said network and comprising a processor for secure processing configured to implement the method according to any of the above embodiments of the method.

The development also relates to a computer program comprising instructions for implementing the method according to any of the above embodiments of the method, when these instructions are executed by a processor of an electronic processing circuit.

In one embodiment, said processor or said electronic processing circuit comprises the system on a chip.

The development also relates to a means of storing information, removable or not, partially or completely readable by a computer or a processor containing code instructions of a computer program for the execution of each of the steps of the method according to any of the above embodiments of the method.

In one embodiment, said means of storing information is a system on a chip arranged to be integrated into the hardware security device.

BRIEF DESCRIPTION OF THE DRAWINGS

Other features, details, and advantages will be apparent from reading the detailed description below, and from analyzing the accompanying drawings, in which.

Unless otherwise indicated, elements which are similar or in common in multiple figures bear the same reference symbols and have identical or similar characteristics, so these common elements are generally not described again for the sake of simplicity.

DETAILED DESCRIPTION OF CERTAIN ILLUSTRATIVE EMBODIMENTS

For the most part, the drawings and the following description contain elements that are certain in nature. Therefore they can serve to provide a better understanding of this disclosure and to help define it, where appropriate.

Figure 1:
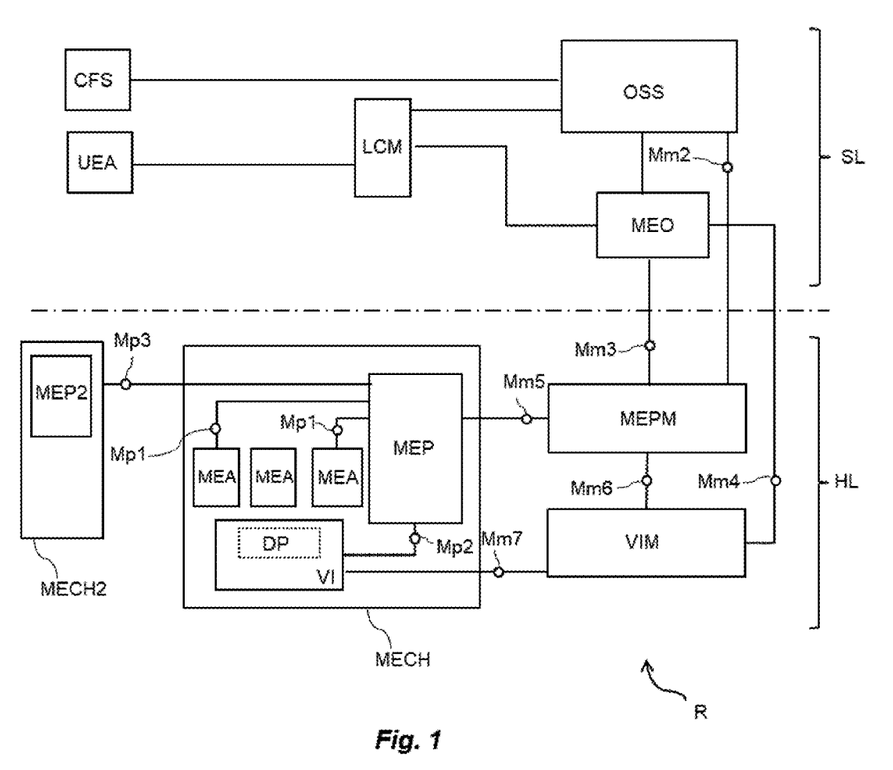
FIG. 1 shows a schematic view of a network architecture according to one embodiment.

Reference is now made to FIG. 1, which shows an example of a multi-access edge computing network architecture according to one embodiment.

Various functional entities involved in the architecture of a MEC network are illustrated. These functional entities are grouped in the MEC network into three levels or layers: a system level SL corresponding to an upper layer, a host level HL corresponding to an intermediate layer, and a network level NL corresponding to a lower layer (not shown).

Level NL provides connectivity of the MEC network architecture to local area networks, cellular networks, and external networks such as the Internet.

As for the intermediate layer, the host level HL comprises a host module of the multi-access edge computing network, called host module MECH (or "Mobile Edge Computing Host"). This host module MECH makes it possible, in particular, to provide a means of storing and processing information.

The host module MECH comprises a multi-access edge platform called platform MEP (or "Mobile Edge Platform"), a virtual network virtualization infrastructure called infrastructure VI (or "Virtual Network Function Infrastructure"), as well as at least one multi-access edge application, called application MEA (or "Mobile Edge Application").

Typically, an application MEA runs as a virtual machine on infrastructure VI. An application MEA interacts with the platform MEP via at least one reference point Mp1, which is also used for implementing any additional support procedures.

An application MEA can indicate the resource or service requirements of the host module MECH, as well as constraints relating to maximum allowed latencies, for example.

The infrastructure VI provides compute, storage, and network resources for the applications MEA. The infrastructure VI further comprises a switching plane, called the data plane DP, configured to execute the transmission rules received by the platform MEP.

The data plane DP, which is generally comprised in the infrastructure VI of the host module MECH, makes it possible, in particular, to route data between the various services, applications and services associated with the architecture.

The platform MEP comprised in module MECH provides a set of basic functionalities for running applications on a host entity and for enabling those applications to use the associated services.

These functionalities are used, for example, to organize the routing of data between applications, services, and networks interacting with or within the MEC network.

The host level HL further comprises other entities external to the host module MECH, such as a host level multi-access edge platform manager, called manager MEPM (or "Mobile Edge Platform Manager"), or a virtualization infrastructure manager, called manager VIM.

Manager VIM is connected to the interface VI by reference point Mm7, which makes it possible to manage the virtualized resources of the host module MECH and/or manage any instantiations. It is also used to preserve information about available resources.

Manager MEPM receives the traffic transfer rules and in particular manages the life cycles of mobile edge applications and management functions.

Manager MEPM is connected to the platform MEP via reference point Mm5 which allows it to transmit instructions. These instructions can be transmitted from the platform MEP to the interface VI via reference point Mp2.

The platform MEP also handles the configuration of a local server if there is one, such as a DNS server, which can be used to direct user traffic to desired edge applications.

The platform MEP can also communicate with other platforms, for example another platform MEP2 comprised in another host module MECH2 of host level HL. This communication takes place via reference point Mp3, which connects host modules MECH and MECH2.

This makes it possible to group several platforms together, which then form a communication grid.

The upper layer, which corresponds to system level SL, comprises an operations support system, known as the OSS system, an LCM proxy (or "Life Cycle Manager"), and a multi-access orchestrator, known as orchestrator MEO (or "Mobile Edge Orchestrator"), which is configured to run mobile edge applications within a network operator.

The orchestrator MEO is arranged to communicate with applications installed on a user device, called application UEA (or "User Equipment Applications"), or with a CFS ("Customer-Facing Service") portal which serves as an entry point for a third-party application.

Herein, application UEA is a web application, meaning an application that can be manipulated directly online using a web browser and not requiring installation on a client machine.

Applications UEA make it possible for applications to be moved between external networks, for example cloud networks, and the edge network. In particular, an application UEA can be an edge application which is instantiated in an element of host level HL in response to a request from a device.

Herein, the LCM proxy is a proxy for managing the life cycle of user applications, and in addition allows applications to request the integration, instantiation, cancellation of user applications or even the relocation of user applications inside and outside the mobile edge network.

At system level SL, an execution of a mobile edge application can be initiated by a third-party device via a reference point called point Mx2 (not shown), located between an application UEA and the LCM proxy. The execution of such an application can also be initiated via another reference point called point Mx1 (not shown), located between the CFS portal and the OSS system.

According to various examples, these various elements of level SL make it possible to implement one or more instantiations of specific applications in the host module MECH, and in particular at the request of one or more applications UEA of a user device.

The orchestrator MEO plays an important role in the system level SL. This orchestrator has knowledge of the topology of the MEC network, of all deployed host modules, and of the services and resources available in each host.

As for the OSS system, it is linked to the host level NL via reference point Mm2 connecting it to the platform MEPM and designed to trigger the instantiation and shutdown of mobile edge applications of the host module, for example.

Reference point Mm2 can also be used for the management of failures, configuration, and performance of the platform MEP.

The orchestrator MEO is connected to the platform MEPM via reference point Mm3, and is further connected to manager VIM via reference point Mm4.

Figure 2:
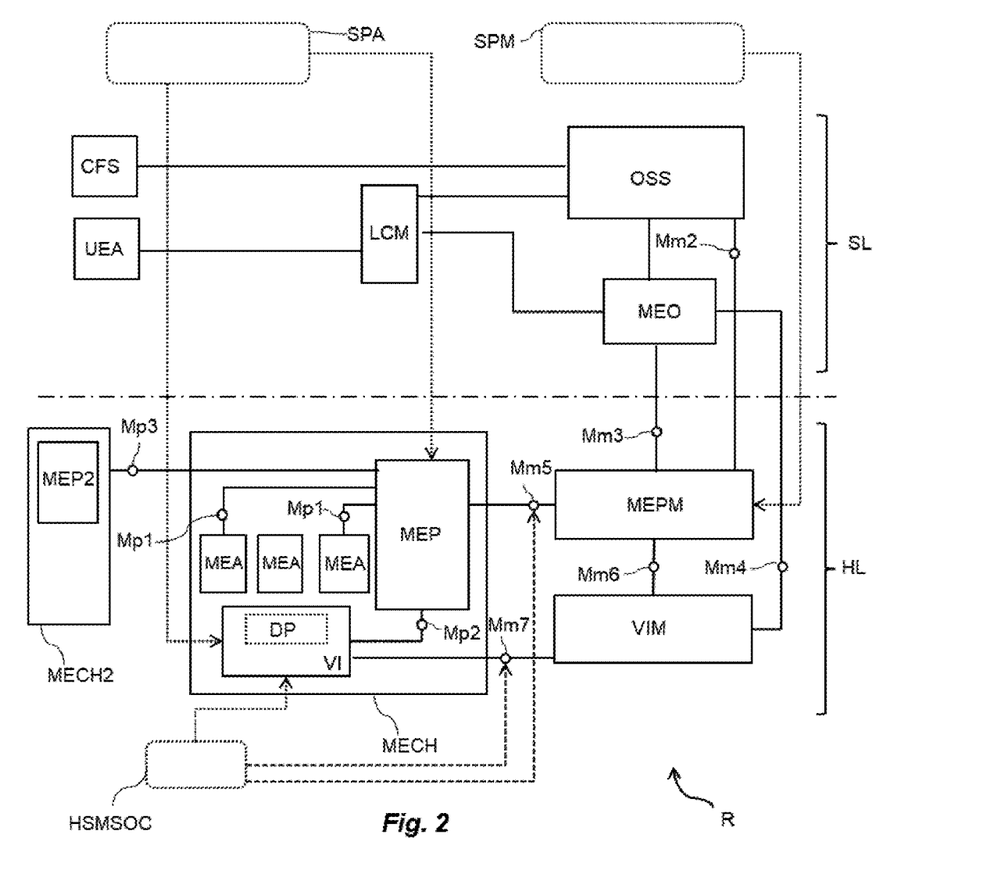
FIG. 2, shows a schematic view of a network architecture according to another embodiment.

FIG. 2 shows an exemplary embodiment of a network made secure by one or more security entities.

The architecture shown uses the various functional entities of the previous figure, as well as several security entities arranged to be connected to one of these functional entities.

A first of these security entities is a hardware security device with a system on a chip, referred to as hardware security device HSMSOC (or "Hardware Security Module System On a Chip").

Herein, the hardware security device HSMSOC can be implemented in at least one of the following three arrangements.

In a first arrangement, referred to as "merged", the hardware security device HSMSOC comprises a hardware security module HSM and a system on a chip SOC, said module and said system constituting a single entity equivalent to the hardware security device HSMSOC.

In a second arrangement, referred to as "remote", the hardware security device HSMSOC comprises a hardware security module HSM and a system on a chip SOC, but said hardware security module HSM and said system on a chip SOC are separated into two distinct, individual entities. These two entities are preferably connected to each other.

In a third arrangement, referred to as "co-located", the hardware security device HSMSOC is an entity comprising a hardware security module HSM and a system on a chip SOC, said hardware security module HSM and said system on a chip SOC being distinct and individual but both present in the hardware security device HSMSOC.

Below we will describe the preferred implementation of the development in the form of this third "co-located" arrangement. This is non-limiting, however: either of the "merged" and "remote" arrangements can be implemented in a similar manner.

In all cases, the hardware security device HSMSOC and/or the elements it comprises are arranged to allow a connection with the host module MECH of the MEC network, for example via the data plane DP comprised in interface VI of the host module MECH or directly via interface Mp2.

A second of these security entities is a security and privacy manager, referred to as manager SPM.

Preferably, manager SPM is arranged to be embedded in platform MEPM.

Manager SPM also allows testing and selecting host modules MECHs that meet predetermined security requirements.

One example of a security requirement is that said host module MECH allows at least the delegation of the encryption or signature to the hardware security device HSMSOC.

A third of these security entities is a security and privacy application, known as application SPA.

Application SPA is designed to be embedded in platform MEP or in an application MEA. Advantageously, application MEA does not share a private key with platform MEP, and allows activating a delegation for implementing a signature or a certificate.

In addition, application SPA allows one or more mechanisms for secure encryption, exchange, and storage of keys to be implemented in order to secure the MEC network.

Figure 3:
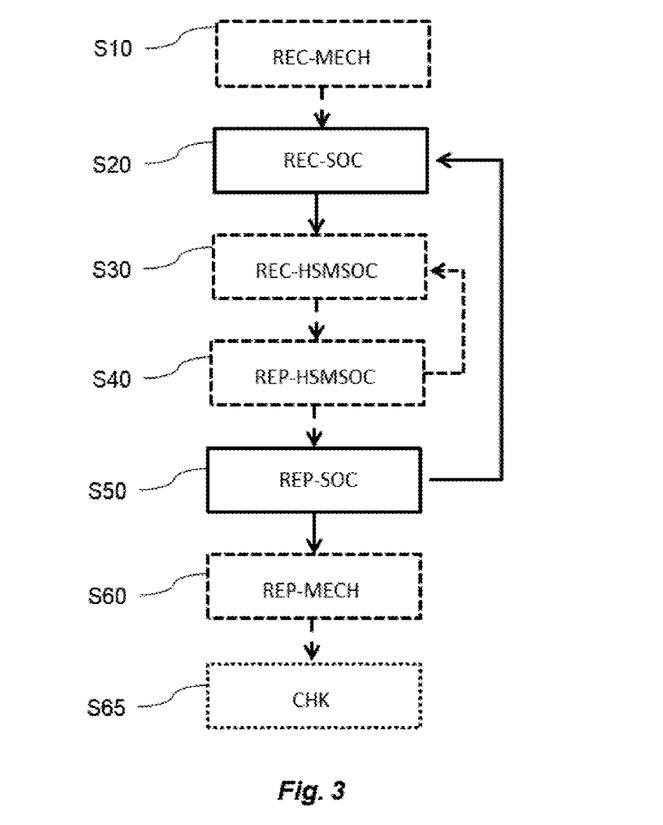
FIG. 3, shows the steps of a method for securing a network according to one embodiment, in the form of a flowchart.

FIG. 3 represents, in the form of a flowchart, an example of steps of a method for securing a network according to one embodiment.

A step S10 concerns the reception of at least one test message Q0 by the host module MECH of the MEC network. This test message Q0 is sent by the SPM manager and is intended to test the presence, location, and/or performance of the host module MECH in the MEC network.

A step S20, which follows step S10, concerns the reception of at least one presence request from the host module Q1, by the hardware security device HSMSOC. Such a presence request from the host module Q1 is sent by the host module MECH before the implementation of the next step and is intended to verify the presence of the hardware security device HSMSOC in the host module MECH.

Step S30, which follows step S20, concerns the reception of a presence request, said presence request being received as a challenge by the hardware security module HSM. Such a challenge is issued by the system on a chip SOC.

Step S40, which follows step S30, concerns the sending of a corresponding response to a challenge received during step S30, said response to this challenge being sent by the hardware security module HSM and being intended for the system on a chip SOC.

Steps S30 and S40 are intended to authenticate the host module and can be repeated iteratively to increase the security of such authentication.

This allows, among other aspects, verifying the computational capacity of the hardware security device HSMSOC (or one of its components), and also determining the distance between said device and other elements of the edge network R.

When the hardware security device HSMSOC has a "merged" arrangement, meaning the hardware security module HSM and the system on a chip SOC constitute a single entity, steps S30 and S40 are not implemented between the hardware security module HSM and the system on a chip SOC.

Step S50, which follows step S40 or which follows a repetition of steps S30 and S40, concerns the sending of a response R1 corresponding to a presence request from the host module Q1 during step S20. The response R1 is sent by the system on a chip SOC and is intended for the host module MECH.

Step S60, which follows step S50, concerns the sending of a corresponding response R0 to a test message Q0 sent by the SPM manager during step S10. This response R0 is sent by the host module MECH and its destination is the SPM manager. Alternatively, a response R0 may be sent by the hardware security device HSMSOC.

Step S65, which follows step S60, concerns verifying the response R0 received by the SPM manager. This verification step S65 can be included in step S60, put an end to all previous steps, and/or trigger a subsequent action step.

In particular, one or the other of these action steps is implemented in order to select a host module MECH which provides a predetermined level of encryption and signature, and/or to deploy corresponding private keys in the network.

In addition, the purpose of these action steps is to prove that one of the network elements embeds such a host module MECH and that delegation is not necessary. If said host module MECH is absent, or if it is not possible to prove its presence, one of these action steps makes it possible to implement a delegation, as described below in the form of an example.

Figure 4:
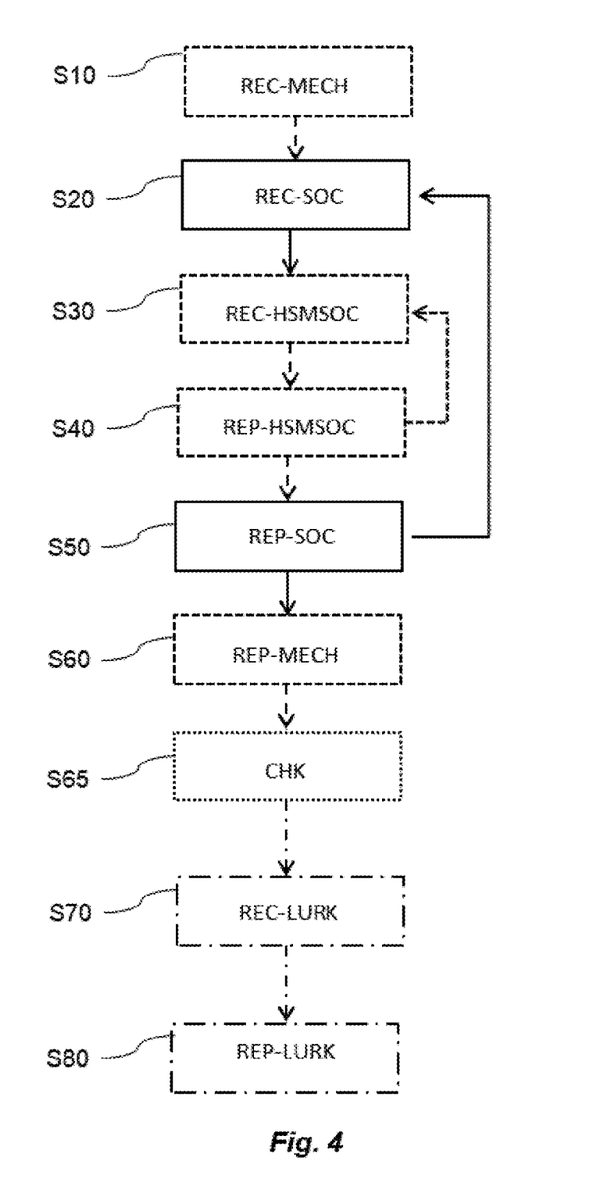
FIG. 4 shows the steps of a method for securing a network according to another embodiment, in the form of a flowchart.

FIG. 4 shows, in the form of a flowchart, an example of steps of a method for securing a network according to another embodiment.

This embodiment makes use of the previous flowchart example, to which are added steps S70 and S80.

Step S70, which follows step S60 or step S65, relates to the reception of a command by a third-party device, and preferably sent to a LURK server located in the MEC network.

Preferably, the command is issued by manager SPM and the action corresponding to this command depends on the result from verifying the response R0.

Herein, a LURK server is a server "lurking" in an existing architecture, meaning a server arranged to be ignored by the usual processes taking place in this architecture. Such a LURK server is for example a virtual server instantiated by manager SPM depending on the content of the response R0.

Step S80, which follows step S70 and may be optional, relates to the sending, by the third-party device, of a response to the command corresponding to step S70.

For example, this response can be an "OK" message from a LURK server that was instantiated in a previous step.

Steps S70 and S80 will be described in more detail in the remainder of the description.

Figure 5:
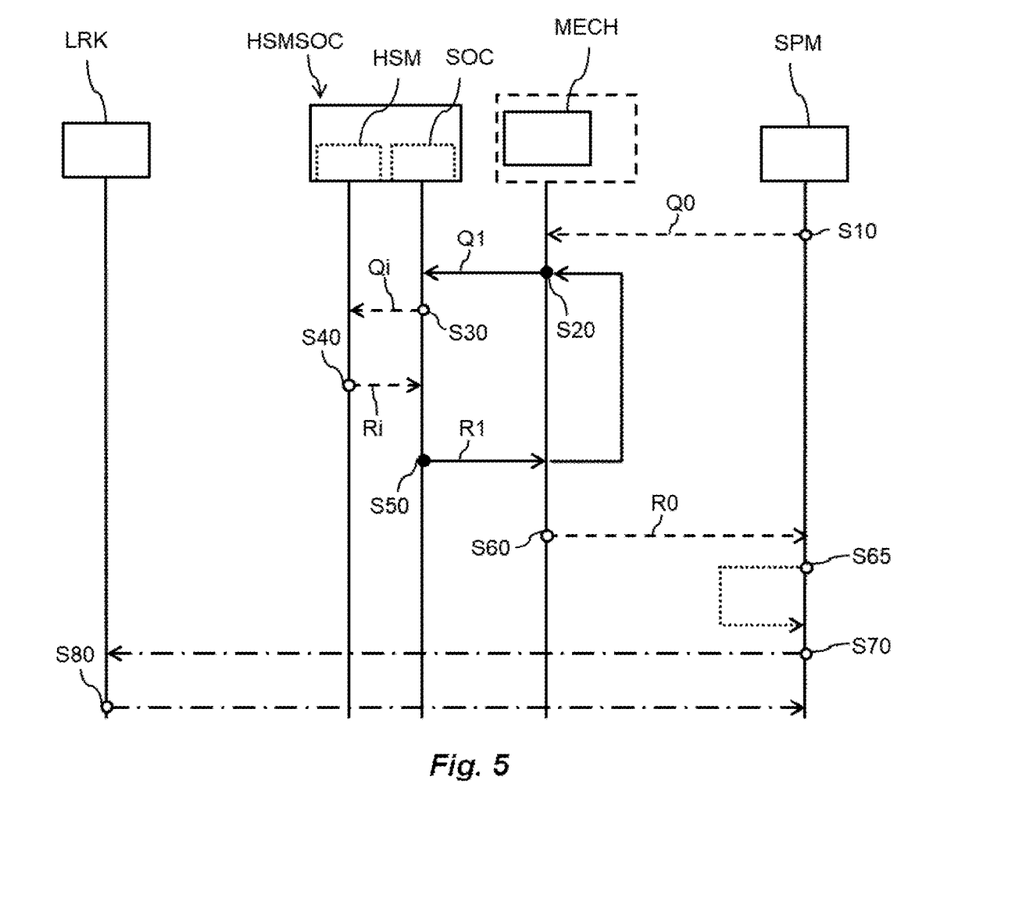
FIG. 5 shows a flow diagram for the steps of a method for securing a network according to one embodiment.

FIG. 5 shows a flow diagram according to one embodiment of a method for securing a multi-access edge computing network.

In the present case, it is assumed that the hardware security device HSMSOC has a "co-located" arrangement.

In step S10, security and privacy manager SPM sends a test message Q0 to the host module MECH.

Preferably, manager SPM is connected to reference point Mm7 in order to implement this transmission.

Step S10 makes it possible to begin the establishment of a proof of co-location.

Preferably, manager SPM has a list of public keys, these public keys provided by a manufacturer or by a user of specific hardware security devices.

The purpose of transmitting the test message Q0 is to test whether the host module MECH has a hardware security device HSMSOC.

In particular, the purpose of the test message Q0 is to verify the location and/or the performance of said hardware security device HSMSOC.

Preferably, manager SPM is connected to reference point Mm7 in order to implement the transmission of the test message Q0. Step S10 thus makes it possible to begin the establishment of a proof of co-location.

In step S20, a challenge is sent from the host module MECH to the hardware security device HSMSOC. Preferably, said challenge is received by a system on a chip SOC comprised in the HSMSOC.

The challenge which is sent from the host module MECH to the hardware security device HSMSOC comprises a transmission of a number "y" of bits to be signed by said hardware security device HSMSOC.

Typically, the number "y" of bits corresponds to a block of data to be signed by means of a given algorithm, for example by means of message authentication codes (or MAC) or a cryptographic message fingerprint with key.

The number "y" of bits corresponds to a large amount of data, and is for example greater than or equal to 20, 24, 256, or 2048 bits. Preferably, the transmitted bits to be signed have a minimum size of 256 bits for ECDSA type keys, and a minimum size of 2048 bits for RSA type keys.

Preferably, an example of an algorithm used to perform such a signature is an algorithm of the cryptographic hash function type (or "Secure Hash Algorithm", SHA), in particular a SHA-256 algorithm, which allows generating a unique 256-bit (32-byte) hash of fixed size that cannot be decrypted.

According to one example, and upon reception of the test message Q0, the host module MECH increments a counter. The incrementing of this counter can also be carried out upon signature of the challenge, and in particular the number "y" of the aforementioned bits.

In step S30, the host module MECH transmits a presence request from the host module in the network, Qi, to the system on a chip SOC. In response to this request Qi, and in step S40, the system on a chip SOC sends a response Ri to the host module. The presence request and the response are respectively received and sent as challenge Qi and response Ri. Iteratively repeating steps S30 and S40 amounts to implementing an iterative authentication operation of the host module.

Among other things, this makes it possible to verify the performance of the host module, its presence, or its distance from other elements of the network.

In particular, step S30 comprises sending a local challenge, said local challenge being defined by a given operator of the network, for example. Preferably, this challenge corresponds to a signature request for a predetermined number "n" of bits to be signed. This signature can be done using one or more algorithms.

For example, below it is described herein that a local challenge can be issued by the platform MEP and/or by an application MEA in order to perform one or more of the subsequent actions.

When the local challenge is issued by the platform MEP, the signature is implemented by means of a private key, said private key belonging to a manufacturer or to an operator of the hardware security device HSMSOC.

Alternatively, when the local challenge is issued by an application MEA, the signature is implemented by means of a private key belonging to a manufacturer or to an operator of the host module MECH or of the hardware security device HSMSOC.

Step S40 comprises sending a response Ri to the local challenge Qi of step S30. Preferably, this response comprises the predetermined number "n" of bits, signed with a private key, this private key belonging to the aforementioned network operator.

In steps S30 and S40, a plurality of presence and response requests may be respectively received and transmitted a plurality of times. To this plurality there is therefore a corresponding number "N" of challenges Q1, Q2, . . . , QN and responses R1, R2, . . . , RN iteratively sent and received in order to implement an authentication of the host module MECH.

Steps S30 and S40 make it possible, in particular, to implement a verification of an identifier of the host module MECH and/or of an identifier of the hardware security device HSMSOC, for example its manufacturer. For example, it is possible, in steps S30 and S40, to simultaneously verify the identity of a manufacturer of the hardware security device HSMSOC. This can be done by sending a challenge to be signed by the system on a chip SOC, said challenge being for example a CSR request. Verification can then be implemented using the public keys corresponding to the manufacturer of the hardware security device HSMSOC. If the presence of private keys is detected, a verification can be implemented with the public keys already present.

In step S50, the system on a chip S50 sends a presence response R1 to the host module MECH, this response including a signature from the hardware security device. In particular, the response R1 comprises the number "y" of bits that the presence request from the host module Q1 initially contained, these bits being signed by at least one private key of the system on a chip SOC.

Moreover, the response R1 may contain at least one response time and/or at least one signature for which a private key belongs to the supplier.

In other words, steps S10 to S60 or, more generally, steps S20 and S50, allow the SPM manager to test a host module MECH, and in particular to verify whether said host module MECH has a hardware security device HSMSOC.

To perform this verification, manager SPM has access to a list of public keys provided by the manufacturer(s) of the hardware security device HSMSOC. During verification, manager SPM transmits a challenge to manager MEPM.

According to one example, the sending of this challenge is implemented by connecting manager SPM to manager MEPM via reference point Mm7.

Advantageously, sending the challenge via reference point Mm7 allows manager VIM to interact with the hardware security device HSMSOC, for example to implement an installation of a key or a certificate.

Manager VIM thus allows a "back to back connection", and in particular a direct connection between an output/input of the host module MECH and an input/output of the hardware security device HSMSOC.

According to another example, the connection can be made via reference point Mm5.

Advantageously, sending the challenge via reference point Mm5 allows the platform MEP and/or an application MEA to perform one or more of the subsequent actions.

Examples of such actions comprise, for example, a distribution or provision of content, in particular via a content delivery network (CDN), a delegation of a signature authorization, or even a delegation of rights for a private or public certificate.

According to yet another example, the connection can be made via reference point Mm7 and via reference point Mm5, simultaneously or successively.

According to various examples, said challenge comprises an identifier of the host module MECH, and a proof of presence of the hardware security device HSMSOC in this host module MECH, for example at reference point Mpg. Validation of this proof of presence determines whether the hardware security device HSMSOC is present in this host module MECH, whether it is absent, or whether it is located elsewhere. Validation of this proof of presence also makes it possible to determine the distance separating the host module MECH from the hardware security device HSMSOC, or even to determine an associated latency time.

In addition, the challenge may comprise other elements such as a proof of co-location. Such proof of co-location can be obtained by incrementing a first counter of the host module MECH and signing the result in a file transmitted to the system on a chip SOC. When the system on a chip SOC receives said file, a second counter can be incremented, and the result can be signed by the system on a chip SOC and sent to the host module MECH.

In step S60, the presence response R1 is sent by the host module MECH to manager SPM.

Upon reception of the presence response R1, and according to various examples, manager SPM can implement various actions.

For example, manager SPM can implement a verification step S65, during which it verifies the content.

In particular, manager SPM can verify a response time and/or a signature contained in the presence response R1, and deduce a performance level therefrom.

For example, if a signature is valid and if a response time is sufficiently short in relation to predetermined conditions, the performance level can be defined as "high", or OK.

If a signature is not valid and/or if a response time is greater than what is expected from predetermined conditions, the performance level can be defined as "low", or "NOK" because this indicates a low level of network security.

The inferred performance level can be used to implement action steps, particularly if it is "low".

Thus, during step S70, depending on the presence response R1 obtained from the host module MECH, an action is implemented by manager SPM to increase the security of the architecture during a subsequent use, or to increase the protection of private keys that will subsequently be used.

According to various examples, and if it has been positively tested that the host module MECH has a hardware security device HSMSOC, manager SPM can implement various actions such as installing a private key in the host module MECH.

Alternatively, manager SPM can instantiate a server, for example a LURK server, in the host module MECH or in a security and privacy application SPA embedded in said host module MECH. It is then possible to redirect any subsequent requests for storage of private keys, to this LURK server.

According to other examples, and if it turns out that the host module MECH does not have access to a hardware security device HSMSOC, manager SPM can implement various actions so that the host module MECH obtains keys, for example keys coming from a LURK server instantiated as described above.

Figure 6:
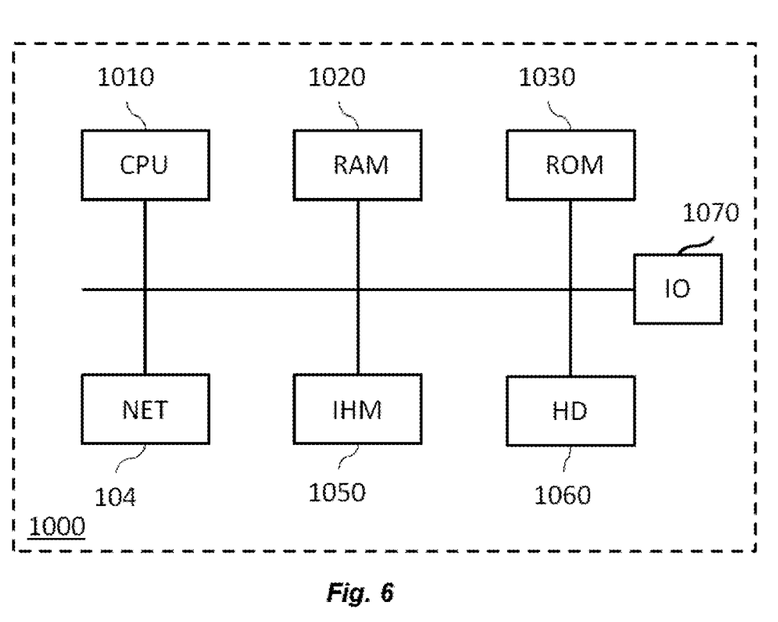
FIG. 6 shows a schematic block diagram of an electronic processing circuit according to one embodiment.

FIG. 6 represents a schematic block diagram of an electronic processing circuit according to one exemplary implementation.

According to one example, said electronic processing circuit is a processor. Preferably, such an electronic processing circuit is a system on a chip 1000 arranged to implement a security method according to one of the embodiments described.

In a non-limiting manner, the system on a chip 1000 implements a method for securing a MEC multi-access edge computing network. The system on a chip 1000 comprises a communication bus, connected for example to a central processing unit 1010, such as a processor or a microprocessor, and denoted CPU.

The system on a chip 1000 also comprises a random access memory 1020, denoted RAM, for storing the executable code of the securing method as well as the registers suitable for storing the variables and parameters necessary for implementing the method according to the embodiments; its memory capacity can be supplemented by optional RAM memory connected to an expansion port, for example.

Furthermore, the system on a chip 1000 includes a read-only memory 1030, denoted ROM, for storing computer programs for implementing the embodiments, as well as a network interface 1040 which is normally connected to a communication network on which digital data to be processed are transmitted or received.

The network interface 1040 may be a single network interface or may be composed of a set of different network interfaces (for example wired and wireless interfaces, or different types of wired or wireless interfaces).

Data packets are sent over the network interface for transmission or are read from the network interface for reception, under the control of the software application running in the processor or microprocessor 1010.

Furthermore, the system on a chip 1000 comprises a user interface 1050 for receiving input from a user or for displaying information to a user, an optional storage medium 1060 denoted HD, and an input-output module 1070 denoted IO, for receiving/sending data from or to external devices such as a hard disk, removable storage medium, or others.

In an example presented here, the executable code can be stored in a read-only memory 1030, in the storage medium 1060, or in a digital removable medium such as a disk for example.

According to a variant, the executable code of the programs can be received by means of a communication network, via the network interface 1040, in order to be stored in the storage medium 1060, before being executed.

The central processing unit 1010 is suitable for controlling and directing the execution of instructions or portions of software code of the program or programs according to one of the embodiments, these instructions being stored in one of the above storage means. After power-up, the CPU 1010 is able to execute instructions stored in the main RAM memory 1020, relating to a software application, after these instructions have been loaded from ROM for example.

In the example shown here, the system on a chip 1000 is a programmable device that uses software. However, alternatively, this description can be implemented in any type of hardware (for example, in the form of a specific integrated circuit or ASIC).

The invention claimed is:

1. A method of securing a multi-access edge computing network, wherein provision is made for a hardware security device designed to be connected to a host module of the multi-access edge computing network, and the method, implemented by the hardware security device, comprises:

upon reception of a presence request from the host module in the multi-access edge computing network, verifying whether the presence request comprises data representative of an identifier of the host module; and, if so, sending a presence response to the host module, comprising a signature of the hardware security device, wherein the presence request and the presence response of the hardware security device are respectively received and sent, respectively as a challenge and a response in an authentication operation of the host module that is implemented by the hardware security device, the response is obtained from the respective challenge by a signature of a predetermined number of bits comprised in the respective challenge, by means of a security key stored in the hardware security device.

2. The method according to claim 1, wherein the presence request from the host module in the network is sent by the host module upon reception of a test message sent by a security and privacy manager to the host module.

3. The method according to claim 1, further comprising a determination of a level of security of the network based on the presence response.

4. The method according to claim 1, wherein the presence request and the presence response of the hardware security device are respectively received and sent a plurality of times.

5. The method according to claim 4, wherein, in each iteration of the iterative authentication operation of the host module, the response is obtained from the respective challenge by the signature of the predetermined number of bits comprised in the respective challenge, by means of the security key stored in the hardware security device.

6. The method according to claim 1, wherein the presence request is verified as comprising data representative of an identifier of the host module when it is verified that the identifier is comprised in a list stored in a memory accessible to the hardware security device.

7. The method according to claim 1, wherein the presence request comprises at least one data item representative of an identifier selected from the group:
proof of attachment, connection information, an operator, an identifier of the host module, manufacturing information, or proof of presence of the hardware security device in the host module.

8. The method according to claim 1, further comprising a security and privacy application module arranged to be connected to the host module and to make use of at least one signature or security key.

9. The method according to claim 1, further comprising, upon reception of the presence response by the host module, an implementation of an action, the action being selected from the group: a verification of the presence response, an instantiation of a virtual server in the host module, an installation of a security key in the host module, a designation of a remote hardware security device, a designation of a remote hardware security device, and/or a designation of a virtual server of a remote host module provided with a security key.

10. A hardware security device for securing a multi-access edge computing network, the device being arranged to be connected to a host module of the multi-access edge computing network and configured to implement the method according to claim 1.

11. An electronic processing circuit comprising a processor and a memory, the memory storing code instructions of a computer program comprising instructions for implementing the method according to claim 1, when the program is executed by the processor of the electronic processing circuit.

12. A non-transitory computer-readable medium, removable or not, containing code instructions of a computer program causing execution of the method according to claim 1.

13. The method according to claim 1, wherein the signature of the hardware security device is a type of private or public certificate or key compatible with the architecture and configuration of the multi-access edge computing network.

* * * * *